INVENTOR
SHIUJI SUGIYAMA

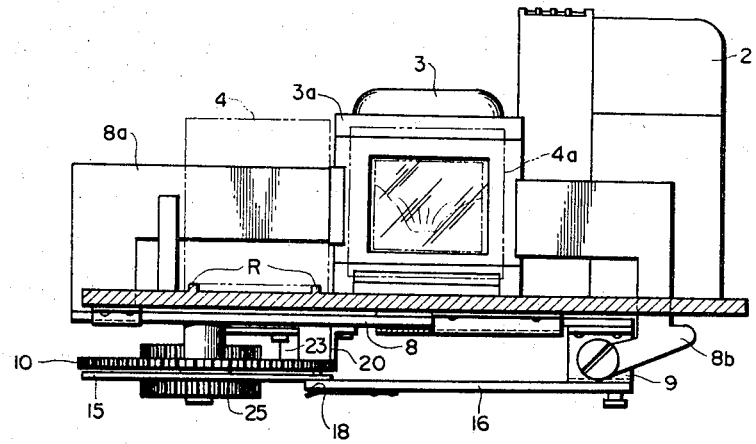
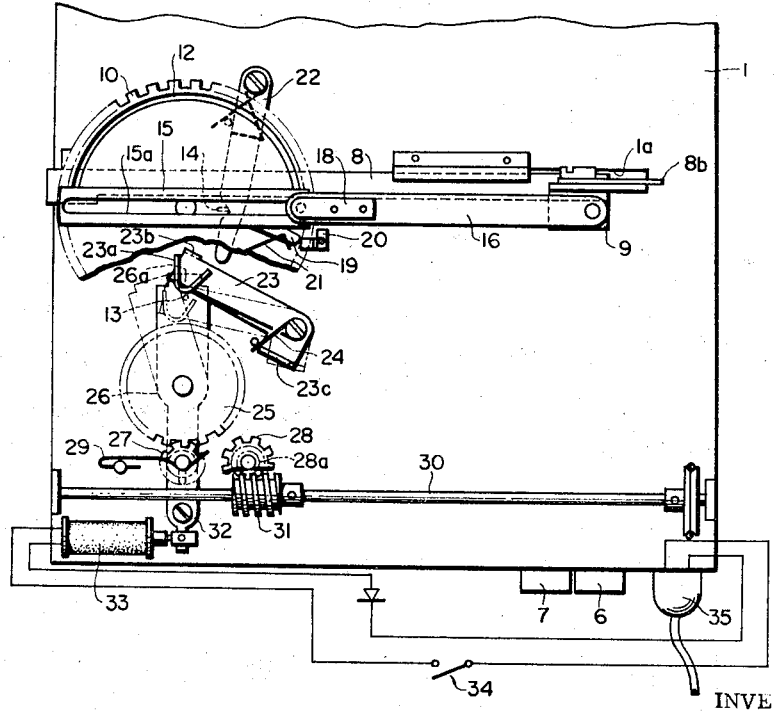

United States Patent Office 3,426,462
Patented Feb. 11, 1969

3,426,462
AUTOMATIC SLIDE STRIP FEEDING DEVICE FOR USE IN OPTICAL IMAGE PROJECTORS
Shiuji Sugiyama, Tokyo-to, Japan, assignor to Cabin Kogyo Kabushiki Kaisha, Tokyo-to, Japan
Filed Mar. 22, 1967, Ser. No. 625,172
Claims priority, application Japan, Apr. 9, 1966, 41/22,312
U.S. Cl. 40—79   4 Claims
Int. Cl. G09f 11/30

ABSTRACT OF THE DISCLOSURE

Quick and easy loading and unloading of a slide strip magazine on and off a power-driven projector during the period when a slide is posted in the path of the projection light is achieved by providing the projector with a rotary wheel adapted to be driven intermittently so as to make one revolution at a time and also with a slide strip feeding mechanism adapted to automatically release the engagement between said bar mechanism and said rotary wheel during the aforesaid period, whereby enabling the operator to manually pull the slide strip feeding bar of said mechanism off the magazine and thereby unload the magazine off the projector during said period.

Background of the invention

*Field of the invention.*—The present invention relates to optical image projecting apparatus, and more particularly to so-called slide projectors.

*Description of the prior art.*—Various types of film-slide projecting apparatus designed so as to automatically feed slide strips successively into the path of light from the light source have been placed on the market.

These automatical slide strip feeding-type projecting apparatuses of the prior art are operated in such manner that a slide strip containing magazine having ring or rectangular shaped frame provided with a set or a row of compartments each being adapted to releasably accommodate a slide strip is first loaded on the chassis of a projecting apparatus, thereafter an appropriate feeding mechanism is actuated by the manipulation of a switch means to feed a slide strip into the path of the light coming from the light source to project the image carried on the slide strip, and then the projected slide strip is placed back into its mating compartment in the magazine, accompanied by the advancement of the magazine by one pitch or the width of one compartment, and then a fresh slide strip is fed into the path of the projection light, and with all this, one cycle of projecting operations is completed. Accordingly, during the normal state of the projecting apparatus which means during projection, the slide strip feeding lever is posted inside the projecting apparatus proper, or in other words, it is in the position of being received deep in the slide accommodating compartment of the slide strip containing magazine. Therefore, when it is desired to load a magazine on the projecting apparatus or to unload the magazine therefrom during the aforesaid position of the slide feeding lever, or when it is desired to unload the slide strip containing magazine off the projecting apparatus because of the discovery, during the projection, that one of the slide strips is placed upside down, the operator will have to pull out the slide strip feeding lever, which, however, is impossible with such prior automatic projecting apparatus when the operating bar of the lever is in the position of being received in the compartment of the magazine. In order to make this pulling-out operation possible also during such position of the slide strip feeding lever, various proposals have been made. A typical device comprises the interposition of a clutch means between the driving means and said slide strip feeding means so that said clutch means is operated externally of the projecting apparatus, whenever necessary, to release the driving means from its engagement with the slide strip feeding means before the slide strip feeding bar coupled to the slide strip feeding lever can be pulled outwardly from its position of being received in the compartment of a slide strip. Another prior device provide a special button adapted to be manipulated by the operator so as to effect a semi-complete motion of the slide strip feeding lever to pull operating bar of this lever outwardly relative to the projecting apparatus. However, all of these devices of the prior art had the disadvantages that the operation required an intricate procedure and that the devices required complicated structures and also that the devices required a relatively large space for their installation and furthermore they tended to become out of order soon and become disabled in the midst of the operation.

Summary of the invention

It is, therefore, an object of the present invention to provide an optical image projecting apparatus which is free from the foregoing shortcomings of the prior art and which is featured by having a rotary wheel adapted to work intermittently so as to make one revolution at a time by a driving means, and a slide strip feeding lever unit adapted to make one cycle of reciprocal movement in accordance with one revolution of said rotary wheel and adapted to be automatically released from its engagement with said rotary wheel when a slide strip is positioned in the path of the light from the light source, whereby allowing the operating bar of the slide strip feeding lever to be manually pulled outwardly from its position of being received in a slide strip compartment of the magazine.

Another object of the present invention is to provide an optical image projecting apparatus equiped with a slide strip feeding means which is so designed that when the image projecting apparatus is operated on the automatic system by a driving means including a motor, the slide feeding strip lever is always adapted to automatically make reciprocating movements but during the period in which the slide strip feeding lever is at rest after having thrusted a slide strip into the path of the projecting light, the operating bar of the slide strip feeding lever can be manually pulled outwardly from the projecting apparatus at any time.

Still another object of the present invention is to provide an optical image projecting apparatus comprising a slide strip feeding means having high reliability and increased durability.

A further object of the present invention is to provide an optical image projecting apparatus comprising a slide strip feeding means having a relatively simple structure which requires a relatively small space for its installation.

Brief description of the drawing

FIG. 2 is a cross sectional view taken along the line II–II in FIG. 1;

FIG. 3 is a bottom view of the essential parts of the device of the present invention at rest which means the period of projection;

Description of the preferred embodiment

Figure 1:
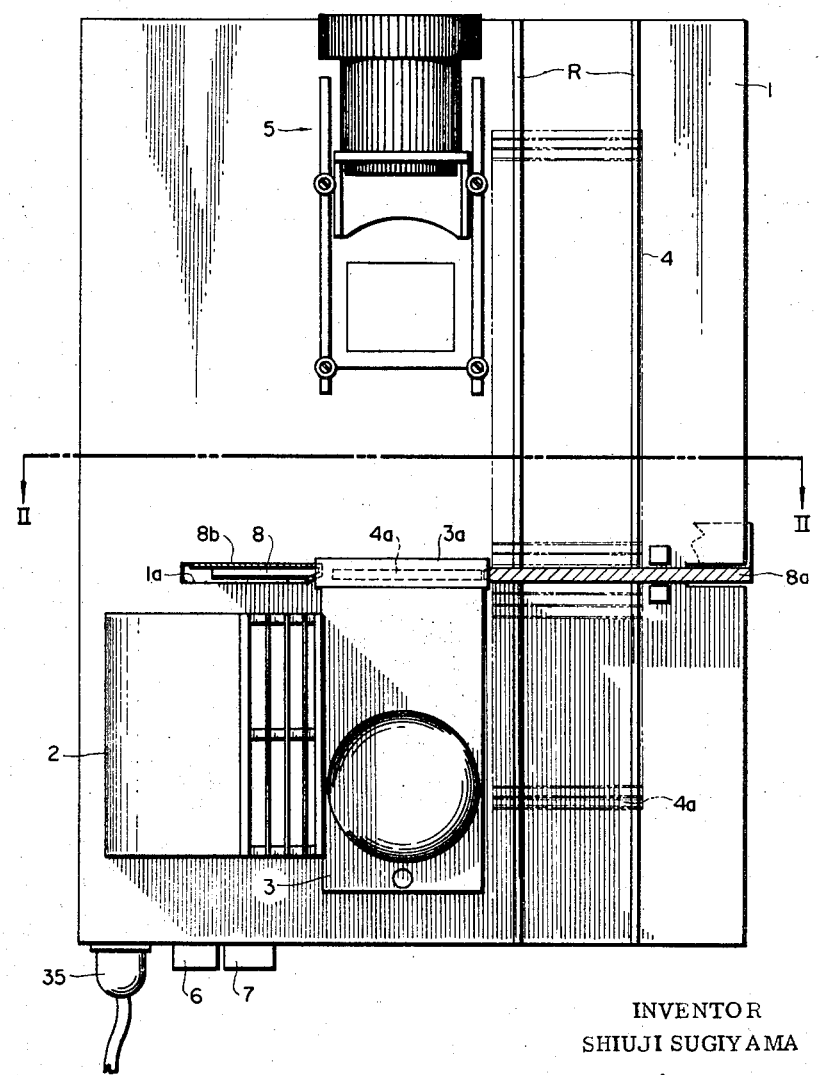
FIG. 1 is a plan view of the essential parts of an optical image projecting apparatus with its cover being detached therefrom and equipped with the device of the present invention.

In the drawing, reference numeral 1 represents a chassis provided with guide rails R for aiding the advancement of a slide strip containing magazine which will be described later also provided with a slot 1a. Numeral 2 represents a motor used as the driving power source for operating the respective parts of the projecting apparatus.

Numeral 3 represents a light source of a known type having, at the foremost end thereof, a frame 3a for accommodating a slide strip 4a.

Numeral 4 represents a slide strip containing magazine comprising a plurality of compartments for accommodating a plurality of film slide strips 4a, respectively, at uniform intervals and in parallel relations relative to each other. Numeral 5 represents a projection lens unit of a known type. Numeral 6 represents a manually operable button slidably mounted on the rear wall of the chassis 1 for being used in starting and stopping the motor. Numeral 7 represents a manually operable button slidably mounted on the rear wall of the chassis 1 for turning on and off the light of the light source.

Numeral 8 represents a slide strip feeding lever slidably supported on the bottom side of the chassis 1 in the direction perpendicular to the axis of the projection light and having, on the front side of the chassis 1, a slide strip feeding bar 8a adapted to enter into each of the slide strip receiving compartments provided in the slide strip containing magazine 4 and a slide strip push-back plate 8b adapted to push a slide strip 4a located in the path of the projection light back into the mating compartment of the slide strip containing magazine 4 and extending upright from said lever 8 through the slot 1a of the chassis 1. Numeral 9 represents an angled member for anchoring the lower end of said push-back bar 8b to said slide strip feeding lever 8 on the bottom side of said chassis 1.

Figure 4:
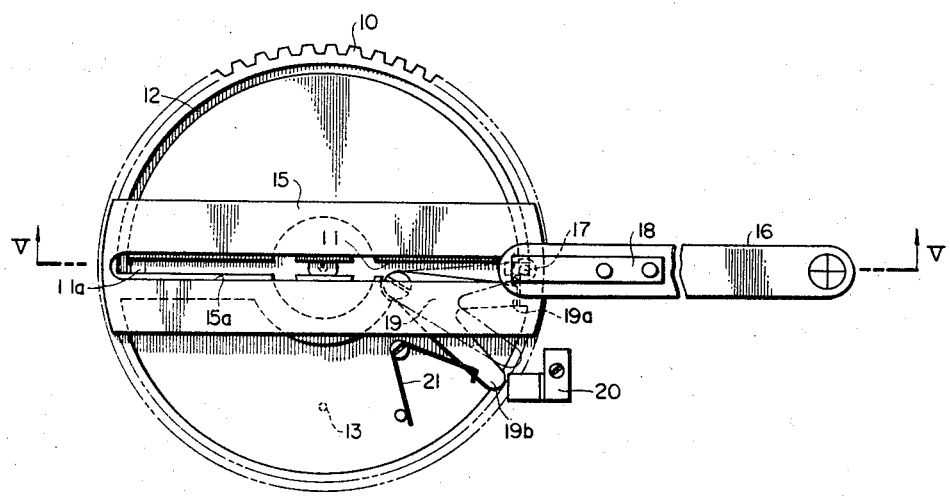
FIG. 4 is a plan view of the device of the present invention assuming a position corresponding to that of FIG. 3.
Figure 5:
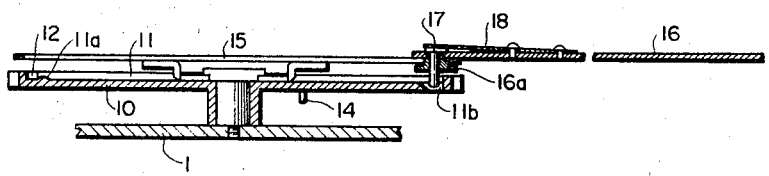
FIG. 5 is a cross sectional view taken along the line V–V in FIG. 4.

Numeral 10 represents a toothed wheel rotatably mounted, about its center, to the bottom side of the chassis 1 and having a diametrical groove 11 provided with a protuberant portion 11a formed at its left end and also with a through-hole 11b formed at the right end so as to slope downward from the bottom of said diametrical groove 11 when viewed in FIG. 3 and also having a semi-circular slot 12 (see FIG. 4) communicating with said diametrical groove 11 and further having pins 13 and 14 extending downwardly from the bottom face of said toothed wheel 10 as viewed also in FIG. 3. Numeral 15 represents a holding plate fixed by bracket at said toothed wheel 10 as viewed in FIG. 3 and having a guide slot 15a adapted to overlie said diametrical groove 11. Numeral 16 represents a connecting bar having, fixed at one end portion, a shouldered hollow member 16a adapted to be slidably received in said guide slot 15a and having the other end pivotally attached to said angled member 9. Numeral 17 represents a pin movably received in said shouldered hollow member 16a and adapted to travel through both the diametrical groove 11 and the semi-circular slot 12. Numeral 18 represents a leaf spring fixed to an end portion of the connecting bar 16 and adapted to urge the pin 17 downwardly as viewed in FIG. 3. Numeral 19 represents a two-armed lever pivotally attached to the upper face of the toothed wheel 10, as clearly viewed in FIG. 4, the tip 19a of one of said two-armed lever being adapted to engage the peripheral wall of the pin 17, and the tip 19b of the other of the two-armed lever being adapted to engage a stopping member 20 secured to the bottom face of the chassis 1 as viewed in FIGS. 3 and 4. Numeral 21 represents a spring for urging the two-armed lever 19 counter-clockwise as viewed in FIG. 4. Numeral 22 represents a stopping lever pivotally attached to the bottom face of the chassis 1 and adapted for holding the toothed wheel 10 in the position as shown in FIG. 3 by being urged clockwise as viewed in FIG. 3 to normally engage the pin 14. Numeral 23 represents a lever pivotally supported by said chassis 1 under the toothed wheel 10 as viewed in FIG. 3 and having an upwardly extending strip 23a with horizontally bent free ends adapted to enter the path of the travel of the pin 13 of said toothed wheel 10 and having a downwardly bent lug 23b and also an upwardly extending portion 23c. Numeral 24 represents a spring for urging said lever 23 counter-clockwise as viewed in FIG. 3. Numeral 25 represents an intermediate toothed wheel adapted to mesh with said toothed wheel 10. Numeral 26 represents a change lever pivotally supported on the rotary shaft of the intermediate toothed wheel 25 and having a protruding lug 26a formed at one end thereof for engaging the downwardly bent lug 23b of said lever 23 and rotatably supporting at the other end thereof a toothed wheel 27 adapted to mesh with said intermediate toothed wheel 25, and also said toothed wheel 27 is adapted to be brought into engagement with a toothed wheel 28 rotatably supported on the chassis 1 and having at the lower portion thereof a worm gear 28a. Numeral 29 represents a spring fixed at one end to a fixed shaft and being adapted to retain the toothed wheel 27 at the position shown in FIG. 3. Numeral 30 represents a rotary shaft transversely mounted on the chassis 1 and adapted to be driven by a motor 2 through appropriate means not shown. Numeral 31 represents a worm secured to said rotary shaft 30 and adapted to engage said worm gear 28a. Numeral 32 represents an operating lever pivotally supported on the chassis 1 and adapted to receive in its notch formed at one free end thereof the rotary shaft of said toothed wheel 27 and being coupled, at the opposite end thereof, to a piston of a solenoid plunger 33.

Numeral 34 represents a switch means adapted, when closed, to apply electric current to an energizing coil of said solenoid plunger 33. Numeral 35 represents a plug for connection with a power source. In the foregoing example embodying the present invention, the toothed wheel 10, the intermediate toothed wheel 25, the toothed wheels 27 and 28 do not have to be toothed wheels. It is needless to say that they may be either rollers or pulleys, provided that they can function in the same manner as are done by toothed wheels.

The periphery edge of the disk wheel 10 is coated with a resilient material.

The apparatus having the foregoing arrangement are operative in such manner that when the toothed wheel 10 has made one revolution from its position shown in FIG. 3, the slide strip feeding lever 8 completes one reciprocating movement so as to push the slide strip which has been posted in the path of the light from the light source back into its own compartment provided in the slide strip containing magazine 4 and at the same time to advance said magazine 4 by one pitch, thrusting a fresh slide strip into the path of the projection light. The apparatus is also designed so that said lever 23 stays at the position indicated by the solid line only when the pin 13 extending from the toothed wheel 10 is located in the position shown in FIG. 3. The apparatus is so designed that in case said pin 13 is located in the position other than the foregoing position, the lever 23 is urged by the elastic force of the aforesaid spring 24 to rotate counter-clockwise to the position indicated by the dot-and-dash line in FIG. 3 so that the downwardly bent lug 23b is brought to the position in which it engages a shoulder portion of the lug 26a provided at the tip of the change lever 26.

The slide strip feeding device of the above described construction and arrangement according to the invention operates in the following manner.

Now, let us assume that the slide strip containing magazine 4 has been already loaded on the projecting apparatus and that a slide strip 4a has been already posted in the path of the projection light from the light source. Description will be directed to the manner in which the slide strip 4a is automatically replaced by a fresh one.

Although not all of the parts of the projecting apparatus are illustrated in the drawings, the first step of the procedure of operation begins with pushing the operating button 6 to start the motor 2. Then, another operating button 7 is pressed upon to turn on the light of the light source. Whereupon, the image carried on the slide strip is projected onto the screen. The procedure of the projecting operation will be completed when appropriate means not shown is operated to adjust the projection lens unit 5 so as to correctly focus the image carried on the slide strip on the screen.

By closing the switch means 34 in FIG. 3 in the foregoing state of the apparatus, the solenoid plunger 33 is actuated so that the piston is pulled leftwise in FIG. 3. Accordingly, the toothed wheel 27 is brought, by the pivotal movement of the change lever 32, into engagement with the toothed wheel 28, and as a result, the rotation of said toothed wheel 28 is transmitted to the toothed wheel 10.

At the same time, the change lever 26 is urged to swing counterclockwise about the rotary shaft of the intermediate toothed wheel 25, which is accompanied by the displacement of the pin 13 of the toothed wheel 10 to release the lever 23 from being held by the pin 13.

Whereupon, said lever 23 is urged by spring 24 to move toward the position indicated by the dot-and-dash line in FIG. 3, with the result that the downwardly bent lug 23b is brought into engagement with the shoulder portion of the lug 26a provided at the tip of the change lever 26 to retain, by resisting the elastic force of the spring 29, the toothed wheel 27 in its position of engagement with the toothed wheel 28. Therefore, even when the switch 34 is turned off to deenergize the solenoid plunger 33, the rotation of the rotary shaft 30 continues to be transmitted to the toothed wheel 10.

Thus, the rotary movement of the toothed wheel 10 continues until the pin 13 again pushes the member 23a of the lever 23 and until the downwardly bent lug 23b is accordingly disengaged from the shoulder portion of the lug 26a of the lever 26 and till the toothed wheel 27 is thereby disengaged from the toothed wheel 28 by virtue of the elastic force of the spring 29, or in other words, the rotation of the toothed wheel 10 continues until said toothed wheel 10 completes one revolution. It is to be noted that the rotary shaft 30 continues to be rotated during the rotation of the motor 2. Since the toothed wheel 10 is constructed so as to advance the slide strip containing magazine 4 by one pitch at a time by virtue of appropriate means not shown, the slide strip containing magazine 4 is advanced in one direction. Thus, in case it is desired to project the image carried on the next fresh slide strip, it is only necessary to close the switch 34 for only a very short period of time. In case the toothed wheel 10 is so arranged as to rotate in the direction and in the manner as have been described above, the tip 19b of the two-armed lever 19, when the toothed wheel 10 rests in the position indicated in FIG. 3, is brought into engagement with the stopping member 20, and accordingly, the other tip 19a of the other of the arms is placed outside the path of the travel of the pin 17. Upon the counter-clockwise rotation of the toothed wheel 10 being started, the two-armed lever 19 is relieved of its retention and is urged by the spring 21 to rotate counter-clockwise relative to the toothed wheel 10, and the tip 19a of one of the two arms of the lever 19 enters into the path, shown by the dot-and-dash line in FIG. 4, of the travel of the pin 17. Therefore, even when there is applied a force onto said pin 17 in any direction, the pin 17 will never be allowed to enter into the diametrical groove 11. Thus, by dint of one complete revolution of the toothed wheel 10, the slide strip feeding lever 8 will positively make one reciprocating movement. Now, in the event that an external force is applied to the slide strip feeding lever 8 so as to move the latter to the left side in FIG. 3 when the toothed wheel 10 is situated in the position shown in FIG. 3, the connecting bar 16 is also transferred thereby in the same direction, and as a result, the pin 17 will slidably ascend the face of the slope of the through-hole 11b of the groove 11 by resisting the elastic force of the leaf spring 18 and then will slidably travel through the diametrical groove 11, and after riding across the protuberant portion 11a, the pin 17 will reach the opposite end of the diametrical groove 11.

During the period of this travel of the pin 17, the push-back bar 8b pushes the slide strip posted in the path of the light from the light source back into its mating compartment in the slide strip containing magazine 4, while the slide strip feeding bar 8a is pulled out from within said compartment of the slide strip containing magazine 4. As a result, the slide strip containing magazine 4 now can be ready for being freely unloaded off the projecting apparatus.

By pushing the slide strip feeding lever 8 into the projecting apparatus in its aforesaid state, the connecting bar 16, the slide strip feeding bar 8a and the push-back bar 8b are restored to their initial normal positions. When the switch 34 is closed when the apparatus is in the foregoing state, the toothed wheel 10 will make one complete revolution in the manner as has been described.

However, when toothed wheel 10 has made a half revolution to counter-clockwise, the pin 17 will slidably travel through the semi-circular slot 12 so as to be received in the through-hole 11b of the groove 11. When the pin 17 is thus received in the through-hole 11b, the tip 19a of one of the arms of the two-armed lever 19 will, in the manner as has been described, obstruct the entry of the pin 17 into the diametrical groove 11 so that the slide strip feeding lever 8 will, during the last half revolution of the toothed wheel, be restored to its initial normal position by the action of the connecting bar 16. Since the pin 17 is obstructed of its advancing movement by the protuberant portion 11a when the toothed wheel 10 is put into motion, the pin 17 is thus prevented from moving backwards into the diametrical groove 11, and therefore, the pin 17 will positively enter into the semi-circular slot 12.

It should be understood, of course, that the foregoing disclosure relates to only a preferred embodiment of the invention and that it is intended to cover all changes and modification of the example of the invention herein chosen for the purposes of the disclosure, which do not constitute departures from the spirit and scope of the invention as set forth in the appended claims.

What is claimed is:

1. An automatic slide strip feeding device for use in an optical image projecting apparatus comprising a light source, a projecting lens unit, a slide strip containing magazine provided with a plurality of compartments each being adapted to contain a slide strip, said slide strip containing magazine being movably and detachably mounted on a chassis of said projecting apparatus, slide strip feeding mechanism including a slide strip feeding bar, a slide strip push-back bar and a connecting bar coupled to each other as a unit, said connecting bar being pivotally attached to said slide strip feeding bar, said slide strip feeding mechanism being adapted to make reciprocating movement to feed a slide strip contained in a compartment of said slide strip containing magazine into the path of the light from said light source and also adapted to return said slide strip into said compartment, a rotary wheel adapted to actuate said slide strip feeding mechanism and also a mechanism for intermittently actuating said rotary wheel so as to make one revolution at a time, said slide strip feeding device comprising a diametrically extending linear groove formed in one face of said rotary wheel and a semi-circular slot formed in said face of said rotary wheel concentrically therewith and connected to said linear groove at both ends of the latter, said linear groove being provided, at one end, with a through-hole having a descending sloped face and also provided, near the other end, with a protuberant portion having an ascending sloped face progressively inclined toward said one end, a holding plate secured to that face of said rotary wheel where said linear groove is formed, said holding plate being provided with a slot adapted to overlie said linear groove, a pin slidably mounted in one end of said connecting bar, a leaf spring secured to one face of said connecting bar and adapted to urge said pin to be received into said linear groove, a two-armed lever pivotally attached on said rotary wheel and adapted to retain said pin in said recess through-hole of said diametrical groove except when said slide strip is posted, by said slide strip feeding mechanism, in the path of the light from said light source, whereby said slide strip feeding bar of said slide strip feeding mechanism can be pulled completely from the compartment of said slide strip containing magazine loaded on the chassis of said projecting apparatus.

2. An automatic slide strip feeding device according to claim 1, said device further comprising a protruding member provided on one face of said rotary wheel, and a stopping lever having a notch portion adapted to receive said protruding member when said slide strip is posted in the path of the light from said light source.

3. An automatic slide strip feeding device according to claim 1, wherein said rotary wheel consists of a toothed wheel.

4. An automatic slide strip feeding device according to claim 1, wherein said rotary wheel consists of a disk having a periphery edge coated with a resilient material.

References Cited

UNITED STATES PATENTS

| | | | |
|---|---|---|---|
| 1,279,142 | 9/1918 | Park | 40—79 X |
| 3,192,657 | 7/1965 | Mulch | 40—79 |
| 3,336,836 | 8/1967 | Gould et al. | |

EUGENE R. CAPOZIO, *Primary Examiner.*

RICHARD CARTER, *Assistant Examiner.*